Patented Dec. 28, 1948

2,457,556

UNITED STATES PATENT OFFICE 2,457,556

REGENERATION OF SYNTHETIC METAL SILICATE ADSORBENTS BY OXIDATION

Heinz Heinemann, Upper Darby, and Knut A. Krieger, Philadelphia, Pa., assignors to Attapulgus Clay Company, Philadelphia, Pa., a corporation of Delaware No Drawing. Application July 28, 1945, Serial No. 607,678

2 Claims. (Cl. 252—242)

1

The present invention relates to a method of regenerating spent synthetic metal silicate adsorbents, particularly those which have been employed in the refining or conversion of hydrocarbons such as petroleum oils, waxes, gases, and the like.

An object of this invention is the regeneration of spent silicate adsorbents containing adsorbed carbonaceous materials resulting from the treatment of hydrocarbon oils, and more particularly is this invention concerned with the regeneration of spent magnesium silicate under conditions conducive to the preservation of useful life of such material.

A further object of this invention is the regeneration of spent synthetic silicates, particularly magnesium silicate which has been used as a catalyst in the conversion of higher boiling hydrocarbon oils into motor fuel of the gasoline boiling range. However, it is to be understood that the method of this invention is also applicable in regeneration of spent synthetic silicates which have been employed in the reforming of naphthas to increase their anti-knock value; or in the desulfurization or removal of gum and gum-forming constituents from hydrocarbon oils and gases; or in the isomerization, aromatization, alkylation, or polymerization of hydrocarbon oils or gases; or in various other uses in which these adsorbents become fouled with tarry or carbonaceous materials and thus lose their conversion or refining efficiency.

We have discovered that in the thermal regeneration of spent or partially spent synthetic silicate adsorbents under conditions conducive to the oxidation of adsorbed carbonaceous materials, the humidity or quantity of water in the regenerating gas, i. e., air or other free oxygen containing gas, is an important factor in determining the extent of recovery of adsorbent activity upon repeated regeneration. More particularly, we have found that spent synthetic silicates, when thermally regenerated in the presence of substantially dry air, will exhibit a slower rate of decrease in conversion or refining efficiency than spent synthetic silicates thermally regenerated in the presence of moist air. The synthetic silicate adsorbents referred to herein include magnesium silicates, calcium silicates, aluminum silicates, as well as silicates of other metals such as Fe, Cu, Ni, Co, Zn, etc. These silicates, while not being equivalent for all purposes, respond to the method of regeneration of our invention, particularly after use in the conversion or refining of hydrocarbons.

2

In accordance with the present invention, a spent synthetic silicate adsorbent containing adsorbed carbonaceous materials is subjected to regeneration by heating at an elevated temperature for a period of time sufficient to remove a substantial portion of the carbonaceous materials, the spent silicate being intimately contacted with substantially dry air or other free-oxygen containing gas during the heating step. By substantially "dry air" we mean air or other oxidizing gas having a moisture content of not more than 3 milligrams per liter of air when measured at 75° F. and 760 mm. pressure. Air or other oxidizing gas which has been dried by passing through a commercial dehumidifying or drying plant, and which has a moisture content not in excess of that above stated is suitable for our purpose. Such dehumidifying or moisture-absorbing plants may utilize agents such as activated alumina, activated bauxite, silica gel, calcium chloride, or copper sulfate for producing substantially dry air.

We prefer to carry out our regeneration of the spent silicate adsorbents at a temperature between 900° F. and 1400° F., very satisfactory results being obtained between 1050° F. and 1200° F., and in no case do we employ temperature so high as to cause sintering of the adsorbent particles. Dry gases other than air may be used in our regeneration, including oxygen, mixtures of air and oxygen or ozone, combustion or flue gases, and the like. The regeneration may be carried out by passing the spent silicate adsorbent through a heated tower or kiln concurrent or countercurrent to a stream of dry oxidizing gas, the gas charged to the tower or kiln having a moisture content not greater than 3 milligrams per liter of gas when measured at 75° F. and 760 mm. pressure. Alternatively, the spent silicate adsorbent may be regenerated in the same vessel in which it was used for converting or refining hydrocarbons, provided such vessel is equipped with suitable means for controlling or dissipating the heat of regeneration. In most cases it is desirable to remove from the spent silicate adsorbent a substantial portion of the adsorbed or mechanically held carbonaceous material such as oil, tar, or polymers, etc., prior to subjecting the silicate to thermal regeneration. This may be accomplished by purging the spent silicate with a non-oxidizing gas at temperatures preferably not higher than about 900° F. Such gases include nitrogen, hydrogen, carbon monoxide, carbon dioxide, methane, ethane, and the like. When steam is used to purge the spent silicate, the temperature should be maintained below about 700° F. and the silicate, after purging, should be dried with air or other gas prior to raising the temperature to the level required for regeneration, i. e., 900° F. to 1400° F. If this is not done, the full benefit of our improved regeneration method will not be realized, since the presence of moisture has an adverse effect at regenerating temperatures. While it is generally more economic to effect purging with a non-oxidizing gas or with steam, such purging may also be effected by treating the spent silicate adsorbent with solvents such as methyl alcohol, ethyl alcohol, isopropyl alcohol, acetone, methyl ethyl ketone, benzene, toluene, naphtha, gasoline, pyridene, or mixtures of two or more thereof. The solvent purging may be carried out at ordinary or elevated temperatures below the decomposition temperature of the solvent, and residual solvent may be removed prior to thermal regeneration by sweeping the purged silicate adsorbent with air, inert gases, or steam. When steam is used, the adsorbent should be dried below 700° F. before regeneration with dry air at higher temperatures. It is to be understood, of course, that purging with nonoxidizing gases, steam, or solvents effects only a partial removal of adsorbed oils, tars, or carbonaceous materials, and that the thermal regeneration removes an additional quantity of such materials. The silicate adsorbent, after regeneration, may still contain small amounts of carbon since it is almost impossible to remove all carbonaceous material, and the small residual carbon content, for all practical purposes, has little or no influence upon the conversion or refining efficiency of the regenerated silicate adsorbent.

Our invention may be further illustrated by the following example, which, however, is not to be construed as limiting the scope thereof. The cracking catalyst was prepared as follows:

344 grams of commercial sodium silicate solution ($Na_2O.2SiO_2$) were diluted with sufficient water to give 1500 cc. of solution. This solution was added over a period of one-half hour to a solution of 212 grams of $MgCl_2$ in 3000 cc. of water at 75° F. Upon completion of the addition of silicate solution to the magnesium chloride solution, the mixture was boiled for 2 hours. The resulting insoluble product was filtered from the solution, washed with water to remove soluble salts, and dried to a volatile matter content of 28.3 percent by weight. The magnesium silicate catalyst was reduced to powder and the powder was compressed into small pellets in a conventional pelleting machine and the resulting pellets were employed as catalyst, such material having the approximate composition $MgO.2SiO_2$.

An East Texas gas oil having an A. P. I. gravity of 37° and a distillation range of 450° F. to 720° F. was employed in the cracking runs reported below. The cracking was carried out by passing the oil through a preheater to raise the temperature of the oil to about 850° F. and the resulting oil and vapors were passed at atmospheric pressure through a bed of magnesium silicate catalyst contained in a heated reaction vessel, the oil being charged at a rate of 1 volume per volume of catalyst per hour. The cracking temperature was maintained at 900° F. The cracked products from the reaction vessel were fractionated and a 400° F. end point gasoline fraction was separated, the quantity of such fraction being indicative of the cracking efficiency of the catalyst. The quantity of gasoline obtained with fresh catalyst in the first cracking run was chosen to represent 100% efficiency, and the comparative decrease in efficiency upon repeated use and regeneration is based upon this arbitrary initial value.

The above catalyst was repeatedly used for cracking and was repeatedly regenerated. In the first case, after each cracking run was completed, the reaction vessel was flushed with nitrogen for 1 hour to purge the catalyst pellets of oil vapors and a portion of the adsorbed carbonaceous materials, and dry air containing not more than 3 milligrams of water per liter at 75° F. and 760 mm. pressure was then passed through the vessel for 1 hour in intimate contact with the catalyst to oxidize and remove an additional quantity of carbonaceous materials, thereby regenerating the cracking activity of the catalyst. During the regeneration, the temperature was maintained at 1200° F. The temperature was then lowered to 900° F. and cracking was resumed. In the second case, the procedure was repeated, using as regenerating gas a stream of air at 100% humidity at 75° F. (22 milligrams of water per liter at 75° F. and 760 mm. pressure). In the third case, steam was used in lieu of nitrogen for purging, and the regenerating gas was a mixture of air and steam. The results obtained are given in the following table, the terms "dry air," and "wet air," and "air and steam" being used for brevity and comprehending the definitions thereof above set forth.

| Catalyst | Magnesium Silicate $MgO.2SiO_2$ | | |
|---|---|---|---|
| Cracking Temp | 900° F. | 900° F. | 900° F. |
| Purging Gas | nitrogen | nitrogen | steam |
| Regenerating Gas | dry air | wet air | air and steam |
| Regenerating Temp | 1200° F. | 1200° F. | 1200° F. |
| Cracking Efficiency: | | | |
| Fresh Catalyst | 100 | 100 | 100 |
| 1st Regeneration | 96 | 61 | 47 |
| 2nd Regeneration | 93 | 57 | 41 |

From the above data, it will be apparent that regeneration with "dry air" gives markedly improved results over regeneration with "wet air" or "air and steam," and the activities of the catalysts decrease rapidly when regenerated in the presence of air containing substantial quantities of moisture. Our invention is particularly adapted to the regeneration of synthetic metal silicates, but is of no utility in the regeneration of acid activated clays, i. e., bentonitic clays which have been activated by treatment with sulfuric acid, water washed, and dried.

We claim:

1. A method of regenerating a spent synthetic metal silicate adsorbent containing adsorbed carbonaceous materials, which comprises purging said spent silicate with steam to remove at least a portion of the carbonaceous materials, removing moisture resulting from the steaming of said purged silicate at a temperature not higher than 700° F., and then heating said purged silicate at a temperature between 900° F. and 1400° F. in a current of air carrying not more than 3 milligrams of water per liter of air measured at 75° F. and 760 mm. pressure for a period of time sufficient to remove an additional portion of said carbonaceous materials.

2. A method of regenerating spent magnesium silicate containing adsorbed carbonaceous materials, which comprises purging said spent silicate with steam to remove at least a portion of the carbonaceous materials, removing moisture resulting from the steaming of said purged silicate at a temperature not higher than 700° F., and then heating said purged silicate at a temperature between 1050° F. and 1200° F. in a current of air carrying not more than 3 milligrams of water per liter of air measured at 75° F. and 760 mm. pressure for a period of time sufficient to remove an additional portion of said carbonaceous materials.

HEINZ HEINEMANN.
KNUT A. KRIEGER.

REFERENCES CITED

The following references are of record in the file of this patent:

UNITED STATES PATENTS

| Number | Name | Date |
|---|---|---|
| 2,215,305 | Voorhies, Jr. | Sept. 17, 1940 |
| 2,225,402 | Liedholm | Dec. 17, 1940 |
| 2,250,416 | Burk | July 22, 1941 |
| 2,278,590 | Ruthruff | Apr. 7, 1942 |
| 2,340,698 | Ruthruff | Feb. 1, 1944 |
| 2,343,731 | Bailie et al. | Mar. 7, 1944 |
| 2,350,282 | La Lande | May 30, 1944 |
| 2,367,281 | Johnson | Jan. 16, 1945 |
| 2,369,074 | Pitzer | Feb. 5, 1945 |
| 2,390,556 | Ruthruff | Dec. 11, 1945 |
| 2,391,944 | Carlsmith | Jan. 1, 1946 |